US008112541B2

(12) United States Patent
Amini et al.

(10) Patent No.: US 8,112,541 B2
(45) Date of Patent: Feb. 7, 2012

(54) METHOD AND SYSTEM FOR DYNAMIC APPLICATION COMPOSITION IN STREAMING SYSTEMS

(75) Inventors: Lisa Amini, Yorktown Heights, NY (US); Henrique C. M. Andrade, Croton-on-Hudson, NY (US); Yoonho Park, Chappaqua, NY (US); Chitra Venkatramani, Roslyn Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 12/131,310

(22) Filed: Jun. 2, 2008

(65) Prior Publication Data

US 2008/0235685 A1 Sep. 25, 2008

Related U.S. Application Data

(63) Continuation of application No. 11/209,584, filed on Aug. 23, 2005, now abandoned.

(51) Int. Cl.
*G06F 15/16* (2006.01)
(52) U.S. Cl. ......... 709/231; 717/120; 717/133; 717/156
(58) Field of Classification Search .................. 709/231; 717/120, 133, 156
See application file for complete search history.

(56) References Cited

U.S. PATENT DOCUMENTS

| 6,581,102 | B1 * | 6/2003 | Amini et al. ................. 709/231 |
| 2003/0154302 | A1 | 8/2003 | Rosenblum | |
| 2003/0223408 | A1 | 12/2003 | Chen et al. | |
| 2004/0078450 | A1 | 4/2004 | Chen et al. | |
| 2008/0188987 | A1 * | 8/2008 | Gu et al. ...................... 700/266 |

OTHER PUBLICATIONS

Abadi, D., et al. Aurora: A New Model and Architecture for Data Stream Management. The VLDB Journal (2003). The VLDB Journal—The International Journal on Very Large Data Bases, vol. 12, No. 2.Jul. 2003. pp. 120-139.

Abadi, D., et al. The Design of the Borealis Stream Processing Engine. Proceedings of the 2005 CIDR Conference. Second Biennial Conference on Innovative Data Systems Research (CIDR 2005). Jan. 2005. (13 Pages).

Chen, J., et al. Niagaracq: A Scalable Continuous Query System for Internet Databases. Proceedings of the 2000 ACM SIGMOD International Conference on Management of Data. May 2000. (12 Pages).

Timos K. Sellis, "Multiple-Query Optimization", ACM Transactions on Database Systems, vol. 13, No. 1, Mar. 1988, pp. 23-52.

(Continued)

*Primary Examiner* — Andy Ho
(74) *Attorney, Agent, or Firm* — Tutunjian & Bitetto, P.C.; William J. Stock

(57) ABSTRACT

A system and method for dynamically building applications for stream processing includes providing processing elements with a flow specification describing each input and a stream description describing each output such that the flow specification indicates a stream or streams which are to be received based on processing information and the stream descriptions indicate the processing information. Processing elements that can be reused are identified by determining equivalence between the processing elements. Processing elements that are new and are not reusable are instantiated in a flow graph. An application is dynamically composed, using the instantiated processing elements by routing available streams to the instantiated processing elements in accordance with the flow specifications.

21 Claims, 6 Drawing Sheets

OTHER PUBLICATIONS

Fa-Chung et al., "Common Subexpression Processing in Multiple-Query Processing", IEEE Transactions on Knowledge and Data Engineering, vol. 10, No. 3, 1998: pp. 1-12.

Myong H. Kang et al., "Multiple-query Optimization at Algorithm-level", Data and Knowledge Engineering, vol. 14, No. 1, 1994; pp. 57-75.

Henrique Andrade et al., "Exploring Functional Decomposition for Efficient Parallel Processing of Multiple Data Analysis Queries", Proceedings of the 17th Int'l Parallel and Distributed Processing Symposium (IPDPS'03) Apr. 2003, Nice, France; pp. 1-10.

Nilesh N. Dalvi et al., "Pipelining in Multi-Query Optimization", Proceedings of the Twentieth ACM Symposium on Principles of Database Systems, Santa Barbara. CA. 2001; pp. 59-70.

Stan Zdonik et al., "The Aurora and Medusa Projects", Bulletin of the Technical Committee on Data Engineering, IEEE Computer Society, Mar. 2003; pp. 1-8.

William Thies et al., "StreamIt: A Language for Streaming Applications", Proceedings of the 2000 Int'l Conference on Compiler Construction, 2002 Springer-Verlag LNCS, Grenoble, France, Apr. 2002; pp. 1-17.

* cited by examiner

METHOD AND SYSTEM FOR DYNAMIC APPLICATION COMPOSITION IN STREAMING SYSTEMS

RELATION APPLICATION INFORMATION

This application is a Continuation application of U.S. patent application Ser. No. 11/209,584 filed on Aug. 23, 2005, now abandoned.

GOVERNMENT RIGHTS

This invention was made with Government support under Contract No.: TIA H98230-04-3-0001 was awarded by the U.S. Department of Defense. The Government has certain rights in this invention.

BACKGROUND

1. Technical Field

The present invention relates to systems and methods for processing data streams and more particularly to mechanisms for processing streams of data enabling the dynamic and automatic composition of applications using processing elements (PE) operating on multiple continuous streams of data. The dynamic composition may comprise two tasks (i) determine whether a PE already running in the system can be reused for a new application and (ii) determine streaming connections based on a novel way of specifying streams and flows for PE ports. This specification allows the application writer to tap into streams that are being produced by other applications or will become available in the future. In illustrative examples, these applications are built in to satisfy inquiries for information submitted by data analysts.

2. Description of the Related Art

Data is increasingly being generated digitally from data sources such as sensors, satellites, audio and video channels, and stock feeds, called streams, which are continuous and dynamic in nature. There is a growing need for extracting information on a continuous basis from these streams to look for abnormal activity and other interesting phenomena.

Traditional information processing techniques, however, are static in nature, in two respects. First, in many cases, data from sources is stored and analyzed periodically. This store-and-analyze technique is not suitable for continuous monitoring or for obtaining real-time results because in many cases it is not possible to store all incoming data, and the cost of reprocessing old data can hinder the application performance considerably.

Second, applications are static in terms of the computation or processing applied to the data. In other words, the computation or analysis does not adapt to new and additional stream data sources being incorporated into the system.

Recently, there have been advances in the area of stream processing. Applications that track and analyze data from numerous streams, monitor them for signs of abnormal activity, identify new trends and patterns, and process them for purposes of filtering, aggregation, reduction, and correlation, are being developed. These can be viewed as stream-oriented operators.

A stream-processing system is a network of streams and stream-oriented operators that service a set of continuous inquiries for information. These operators can perform standard filtering, mapping operations, and more advanced information-mining operations on various data types such as text, audio, video, etc. and extract information to answer the inquiries about relationships and correlations present in the data.

These systems have important shortcomings in terms of providing a systematic specification of streams and data flows as well as methods for the dynamic composition of a stream processing graph. For example, the publish-subscribe (pub-sub) paradigm can be used for stream processing. In conventional pub-sub systems, subscriptions are specified in terms of logical expressions over attributes and their associated values/ranges to identify messages that the subscriber requires, or over logical names (a.k.a. topics or channels) assigned to a stream. Objects with attributes are published by publishers and the pub-sub system matches these against subscriptions and routes the objects to the interested subscribers. This enables the construction of one or more applications, each comprising a network of publishers and subscribers with flows among the publishers and subscribers.

This does not, however, address the requirement of applications that are to be incrementally composed and/or dynamically reassembled from data-processing building blocks in response to changes in the data flowing into the system or new inquiries from analysts over time. Topics and channels are not functionally described to the degree that permits the dynamic rearrangement of stages in a computation pipeline, which is needed in the stream-processing context where reacting to changes in the data stream is important.

In other stream processing systems, a graph may be composed per submitted inquiry without consideration of other inquiries currently running. Also, the streaming connections are determined when the query is submitted and not during run-time. Finally, the stream processing graph is directed and acyclic implying that there is no provision for controlled feedback stream connections.

Likewise, StreamIt™, a programming language and a compilation infrastructure specifically engineered to facilitate the programming of large streaming applications as well as their efficient mapping to a wide variety of target architectures has an organization of processing operators that is hierarchical and left to the programmer to statically specify.

In stream processing systems, data streams are processed as a pipeline of operators (which may or may not have feedback flows affecting earlier stages of the computation). If systems that support stream descriptions only in terms of stream/topic names and attributes, are then automated, incremental composition would place the burden on all application writers to agree to append attributes (from a known set) describing the operations performed on the stream. Without a means to enforce this declaration, the content routing becomes ambiguous and the dynamic and transparent composition of operators cannot be achieved.

Another body of work related to application composition across multiple queries is in the field of multi-query optimization techniques used in databases. Queries are represented using relational algebra and when multiple queries are optimized together, results of one or more queries may be reused to obtain the results of others. Because these techniques deal with persistent and static data, they are not adequate to describe flows of streams in a stream-processing context such that individual stages in a computation pipeline can specify their inputs and outputs in terms of attributes and operators.

SUMMARY

Embodiments of the present invention provide a way of determining processing elements (PE) reuse across applications and also provide improved routing and flexibility for processing data streams. For example, by permitting a flexible specification of streams and flows, embodiments described herein provide automatic content-routing. This relieves the burden of content-routing specification from the programmer.

An application includes a collection of PEs, which may produce and consume streams. The system and method for dynamically building applications for stream processing includes dynamically determining which streams connect to PEs using a flow specification describing each input port and a stream description describing each output port. The flow specification indicates a stream or streams which are to be received based on processing information and the stream descriptions indicate the streams that are being produced by this PE. The system/method also includes determining if a PE needs to be instantiated or if an already running version can be reused.

An application is dynamically composed, using the instantiated PEs by routing available streams to the instantiated PEs in accordance with the flow specifications. PEs that can be reused are identified by determining equivalence between the PEs. PEs that are new and are not reusable are instantiated in the graph.

A method for dynamically building applications for stream processing includes providing processing elements with a flow specification describing each input and a stream description describing each output such that the flow specification indicates a stream or streams which are to be received based on processing information and the stream descriptions indicate the processing information, and determining processing elements that can be reused by determining equivalence between the processing elements. The processing elements that are new and are not reusable are instantiated. An application is dynamically composed, using the instantiated processing elements by routing available streams to the instantiated processing elements in accordance with the flow specifications.

A system for dynamically building applications for stream processing includes one or more processing elements having a flow specification describing each input and a stream description describing each output such that the flow specification indicates an existing (or yet to exist) stream or streams which are to be received based on processing information and the stream descriptions indicate the processing information. An application data flow description identifies a plurality of processing elements and streams needed to perform a task. A dataflow graph manager parses the application dataflow description to determine which processing elements could be reused and which processing elements need to be added to a dataflow graph as instantiated processing elements, wherein the dataflow graph manager enables dynamic composition of an application using the instantiated processing elements by routing available streams to the instantiated processing elements in accordance with their flow specifications.

These and other objects, features, and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
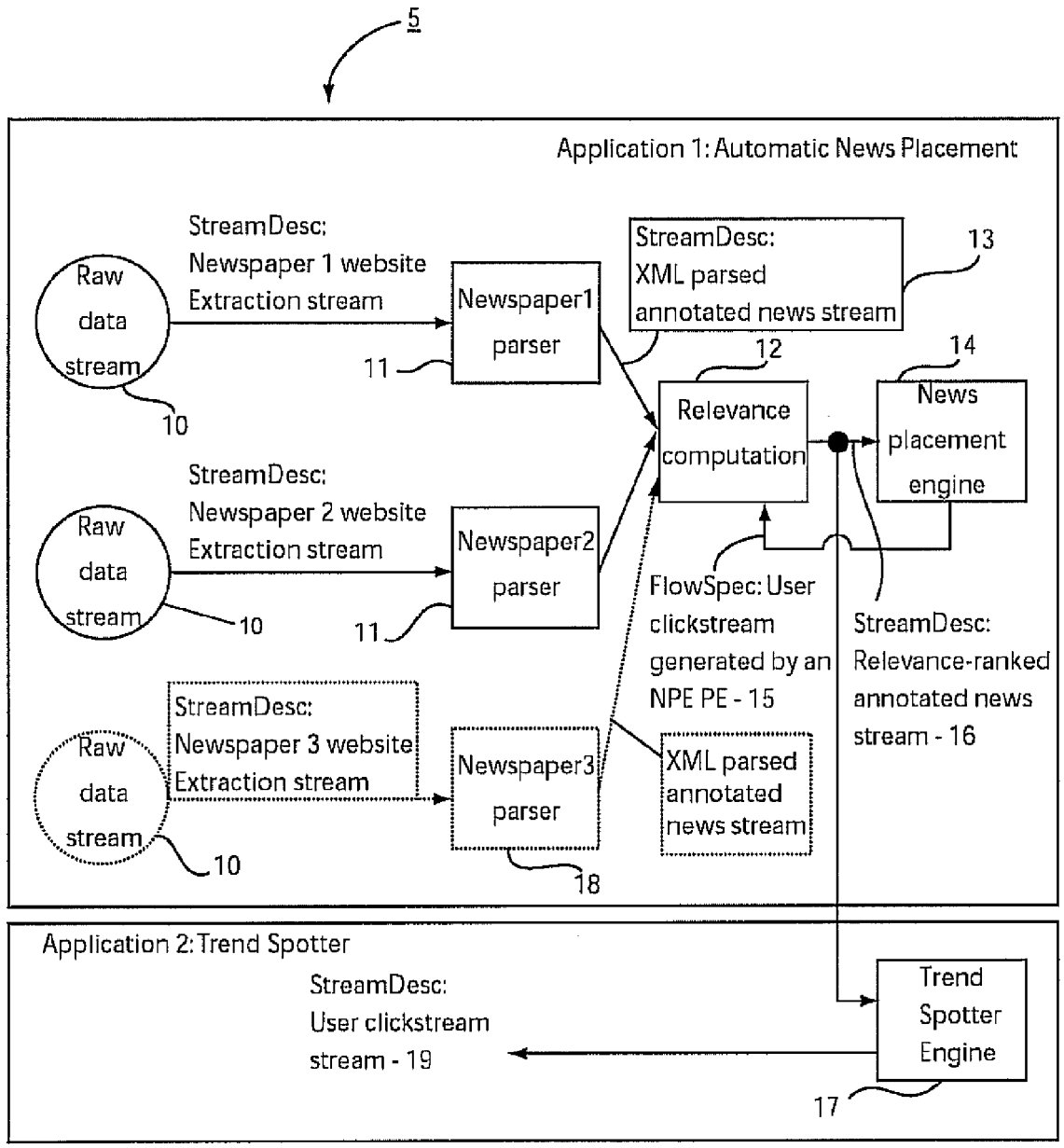
FIG. 1 is a block diagram showing dynamic application composition for two applications in accordance with one illustrative embodiment.

Embodiments of the present invention include systems and methods to incrementally compose stream processing applications based on determining processing element (PE) reuse and a novel description of streams by the producer and flows by the consumer. These methods are applicable to publisher-subscriber (pub-sub) systems and may be necessary to dynamically build stream processing applications.

The following terminology is employed:

Stream: A stream is a contiguous group of stream data objects (SDOs) having a defined format.

Format: A format is a set of attribute or metadata specifications and is provided for each port in a PE. The format for an input port restricts the SDOs the PE can process and the format for an output port defines the SDOs in the output stream.

Stream Data Object (SDO): An SDO is the data object being transported by a stream and conforms to the output port format.

Processing Element (PE): A PE is a computational operator or object that describes an individual processing step needed by an application. A PE may consume data from a (collection of) stream(s) through an input port, may compute results, create and write those results to an output port, thus potentially originating a new stream.

PE Descriptors (PEDesc): A PE descriptor describes the PE in terms of its computational operations and input and output ports.

Stream Descriptors (StreamDesc): A stream descriptor is associated with each output port of a PE and it provides the description of a stream produced by the PE on that port. The descriptor includes a symbolic name, the format of the SDOs it will generate, and the identity of the PE that produces it.

Flow Specification (FlowSpec): A flow specification is associated with each input port of a PE and it identifies the data a PE is interested in receiving. The FlowSpec includes the format of SDOs the port can consume and a regular expression on the names of streams that the PE intends to receive. Note that: i) different streams may match this regular expression during the lifetime of the PE; and ii) The SDO format of these streams should match the format in this FlowSpec for a connection to be made. The grammar for the FlowSpec expression is illustratively shown as follows:

FlowSpec ::= STREAMS <RE>
<RE> ::= <union> | <simple-RE>
<union> ::= <RE> "|" <simple-RE>
<simple-RE> ::= <concatenation> | <basic-RE>
<concatenation> ::= <simple-RE> <basic-RE>
<basic-RE> ::= <star> | <plus> | <elementary-RE>
<star> ::= <elementary-RE> "*"
<plus> ::= <elementary-RE> "+"
<elementary-RE> ::= <group> | <any> | <char> <set>
<group> ::= "(" <RE> ")"
<any> ::= "."
<char> ::= any non metacharacter | "\" metacharacter
<set> ::= <positive-set> | <negative-set>
<positive-set> ::= "[" <set-items> "]"
<negative-set> ::= "[$\hat{0}$" <set-items> "]"
<set-items> ::= <set-item> | <set-item> <set-items>
<set-item> ::= <range> | <char>
<range> ::= <char> "-" <char>

Global Runtime Dataflow Graph (GRDG): The GRDG is a set of tables with the representation of the current system topology including instantiated PEs and the stream connections. For each PE, the GRDG keeps a reuse counter along with information about its ports. For each input port, it keeps the FlowSpec and all the streams that match it at any given point in time. For each output port, the GRDG keeps its StreamDesc and all the ports connected to that stream.

Inquiry: An inquiry is a user request for future data, data patterns, or correlation amongst data objects present in a stream or a collection of streams.

Application: An application is a collection of PEs dynamically assembled to compute the results needed by an inquiry.

Dataflow Graph Manager (DGM): A software component that implements the dynamic application composition method when new applications are submitted for execution in the system. The details of the method are described later.

One problem with standard techniques lies in the fact that applications supporting an inquiry cannot dynamically react to changes in the data (i.e., alter their functional behavior to adapt to new patterns being observed in the stream data objects), nor can the inquiry incrementally build or reuse PEs already in place or the streams being produced. The present invention addresses these problems employing descriptors for streams and flows and a mechanism implemented by a Dataflow Graph Manager that relies on these descriptors as described below.

The application responsible for addressing each new inquiry to the system is expressed as a collection of PEs. Each PE description, in turn, includes a description of its input ports (with FlowSpecs) and its outputs (with StreamDescs). When the DGM receives such a PE collection, the DGM determines which of these PEs can reuse existing PEs and what streaming connections should be made in the GRDG. The DGM implements methods to do this incremental and dynamic application composition as new PEs and the streams they produce appear in the system, and the DGM also permits stream-based feedback loops such that results determined by future processing stages can feed back into earlier processing stages to improve confidence in the analysis.

Instead of starting up each inquiry as a separate set of PEs and streams, the DGM determines which existing PEs can be reused for a new inquiry, thereby obtaining resource savings across applications. The DGM determines PE reuse by computing the equivalence of PEs. The DGM maintains the current state of the system in the Global Runtime Dataflow Graph (GRDG) and uses this to compute equivalence.

Two PEs are deemed equivalent if they have equivalent PE descriptors which means that they have the same input port and output port descriptions with equivalent FlowSpecs and StreamDescs. If a PE in an application is equivalent to an existing PE in the system, it is not instantiated and the DGM increments the existing PE's reference counter. In other words, the DGM grafts the submitted inquiry onto the system. Once it is determined that a PE should be instantiated, the PE is deployed in the system. Once the PE is deployed, the DGM determines the streaming connections by evaluating the existing StreamDescs (with stream names) against the FlowSpecs (regular expression on stream names), across the entire graph.

Stream names specified in the FlowSpecs may resolve either statically to streams currently instantiated or dynamically during run-time as new inquiries add new streams to the graph. For the dynamic application composition, the DGM evaluates the FlowSpecs every time a new stream is added to the system and determines which new streaming connections need to be made based on the FlowSpecs for the input ports belonging to PEs already in the system. The FlowSpec matching process is continuous. This is because when running, the stream processing system processes short-lived and long-lived inquiries, which may result in streams being opened and closed.

Also, various PEs may, at runtime, decide to open or close streams based on what they find in the content they inspect. This scenario results in a dynamic system where new streams are opened and closed and, consequently, the streams matching a FlowSpec may vary over time.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Referring now to the drawings in which like numerals represent the same or similar elements and initially to FIG. 1, a block/flow diagram illustrates how dynamic application composition, feedback, and reuse may be enabled in accordance with embodiments of the present invention. FIG. 1 depicts two illustrative applications for a system 5 which receives and processes streaming data, which may be performed by the present invention. These applications are depicted together for demonstration of application composition and PE reuse.

System 5 enables dynamic application composition, controlled feedback, and automatic PE/stream reuse. As mentioned, two applications are illustratively described. Application 1 is Automatic News Placement (ANP), which automatically computes the placement of news for a metanews website based on (1) the relevance of the news as extracted from newswire websites 10 (e.g., news displayed more prominently are deemed more important), and (2) the relevance of the news for readers (users) who access the metanews website, e.g., the clickstream as users peruse the metanews website.

A second application (application 2) includes a Trend Spotter Engine (TSE) 17 which focuses on identifying trends by tracking the volume of buzzwords in the news. Note that the two applications are completely independent and can be independently assembled from a library of operators (e.g., PEs) and instantiated at different points in time.

To demonstrate dynamic application composition, suppose News Parser PEs 11 are already instantiated and Application 1 is submitted first. The Automatic News Placement (ANP) uses the Relevance Computation Engine (RCE) PE 12. This PE has two input ports. A first input port has a FlowSpec which requests any streams 13 that have "XML Parsed Annotated News" in their name (this represents a dynamic flow-spec for an input port). Thus, it matches the output streams from the News Parser PEs 11 and they are automatically routed to this PE 12. A second input port has a FlowSpec matching "NPE User clickstream" stream 15 generated by NPE 14. This results in a feedback loop.

Stream 15 includes SDOs describing which pieces of news are currently attracting most user attention. Stream 15 is therefore routed to the second input port of the RCE PE 12. The RCE PE 12 uses this input to rank the news items it obtains on its first input port and outputs stream 16 which has SDOs with relevance-ranked news items.

Suppose a new inquiry requests the fashion trends for the Spring season. This translates to a new application, Application 2, which is a fully specified dataflow graph describing the application (e.g., it includes the Newspaper Parser PEs 11, the RCE PE 12, and the News Placement Engine PE 14).

A DGM (not shown) detects PE reuse and identifies that many of the PEs can be reused from the ANP application (application 1), and only the TSE PE 17 is instantiated. Note that since this FlowSpec of the RCE PE's (12) second input port is "NPE User clickstream" and is very specific, an output stream 19 of the Trend Spotter PE 17 will not be routed to this port, preventing unintended feedback loops.

Dynamic application composition of a different nature is achieved as new streams matching a FlowSpec become available. For example, because the RCE PE 12 has declared the FlowSpec for one of its input ports as "XML Parsed Annotated News" 13, when a new newspaper parser PE 18 comes online, its output stream is also routed to RCE 12.

Figure 2:
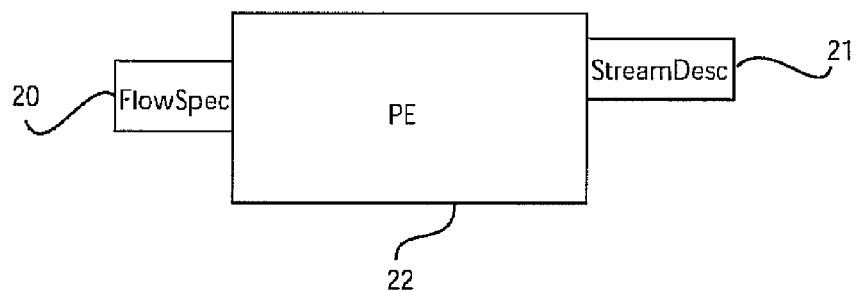
FIG. 2 is a conceptual depiction of a PE with an input port described by a FlowSpec and an output port described by a StreamDesc in accordance with the present invention.

Referring to FIG. 2, an illustrative block diagram showing a conceptual depiction of a PE 22 with one input port 20 described by a FlowSpec and one output port 21 described by a StreamDesc. PEs may have zero or more input and output ports.

Figure 3:
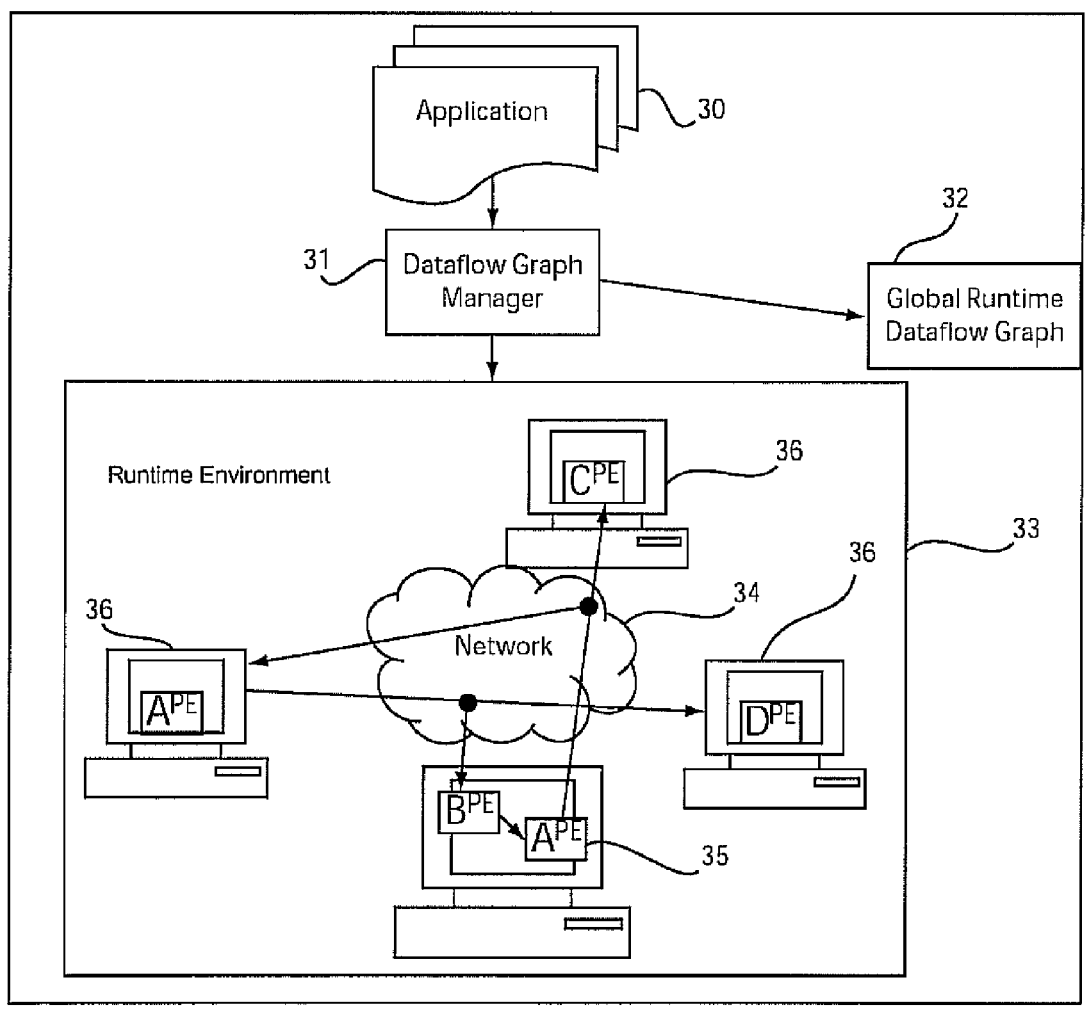
FIG. 3 shows an application/inquiry environment where an inquiry is addressed by deploying a collection of PEs whose placement and interconnections are determined by a Dataflow Graph Manager in accordance with illustrative embodiments.

Referring to FIG. 3, a system level diagram of a computer network 34 in which applications 30 are submitted to a Dataflow Graph Manager (DGM) 31 and run in a Runtime Environment 33 is indicated. The application 30 includes a set of PEs, which describe the streams produced by each output port using StreamDescs and the properties of streams the PE intends to consume using a FlowSpec per input port (see e.g., FIG. 2). The DGM 31 infers reuse, determines producer-consumer relationships by consulting a GRDG 32, and incorporates the new application into a Runtime Environment 33. Each of PEs (e.g., A, B, C, D) 35 run on a computer 36 which is networked 34 with other computers 36. Stream flows occur between PEs 35 and hence can be within a single machine or between different machines.

FIGS. 4, 5, 6 and 7 describe the flow of illustrative methods/systems in accordance with the present invention to dynamically determine incremental application composition by determining PE reuse and dynamically routing new streams to the appropriate consumer PEs.

Figure 4:
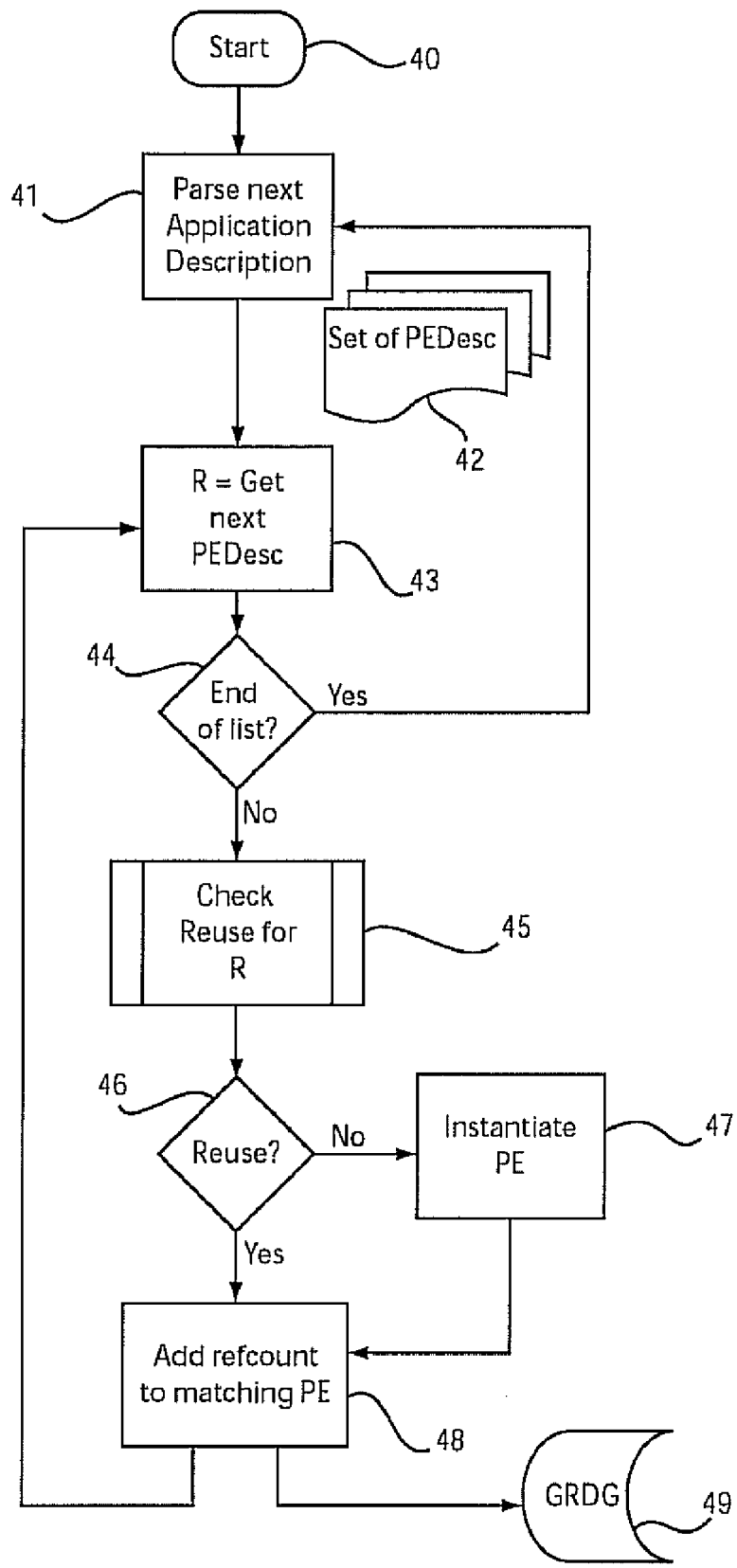
FIG. 4 is a block/flow diagram of a system/method for performing dynamic application composition in accordance with one illustrative embodiment.

Referring to FIG. 4, dynamic application composition in accordance with exemplary embodiments is illustratively shown, where PE descriptions in a new application are compared against a current list of instantiated PEs to determine PE-equivalence for reuse. PEs that can be reused are not instantiated.

The DGM gets an application description and parses it in block 41, extracting a set of PE descriptors 42. In block 43, for each of the PE descriptors R needed by an application, the DGM checks, in block 45, to see if there is an equivalent instantiation already in the Runtime Environment in block 46 by querying the GDRG 49. If there is such a match in block 48, the DGM increments the reference counter for that PE in the GRDG 49 and continues processing the remaining PE descriptors in block 44. If no equivalent PE is found, the DGM instructs the Runtime Environment to instantiate the needed PE in block 47. The DGM updates the current state of the PEs and streams in the GRDG in block 49 with the information about all new PEs and streams (if any) that were created.

Figure 5:
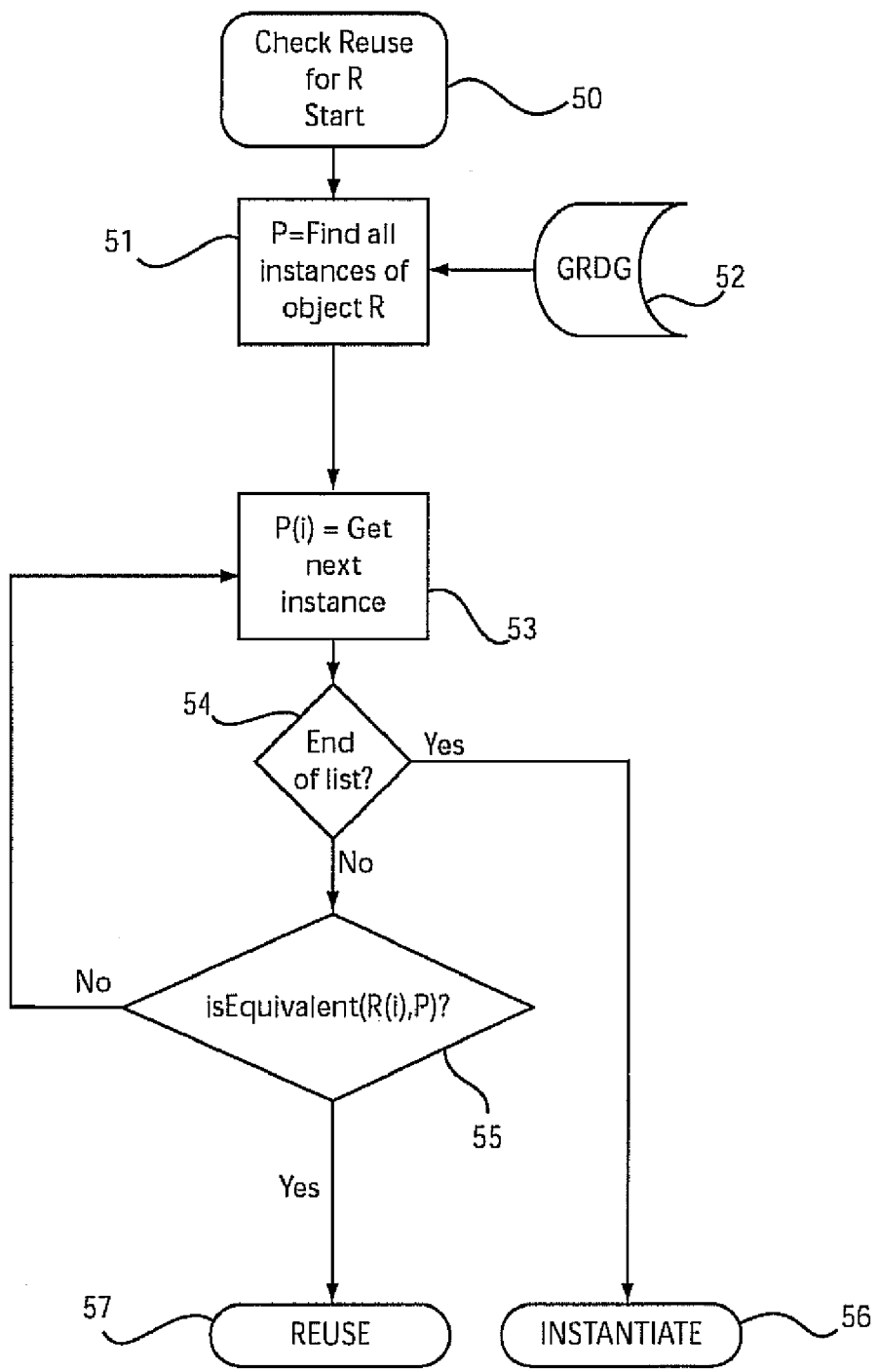
FIG. 5 is a block/flow diagram showing a system/method for determining that a PE for a new application does not need to be instantiated and an existing PE can be reused instead in accordance with one illustrative embodiment.

Referring to FIG. 5, PE reuse is determined. If a PE from a new application is equivalent to a PE in the Runtime environment, it does not need to be instantiated, because the output streams for the existing PE in the environment can be directly reused by tapping into its existing streams. The DGM first computes the set of all instances of this PE into a set P in block 51 by consulting the GRDG 52.

In block 53, for each PE, P(i), in set P, the DGM verifies if the isEquivalent (P(i), R) operator returns true in block 55. The isEquivalent operator returns true if P(i) and R are equivalent using the method depicted in FIG. 6. If a P(i) is found to be equivalent to R, the PE R is tagged REUSE in block 57, otherwise it is tagged INSTANTIATE in block 56. The process is iterative and goes through the list of PEs in block 54.

Figure 6:
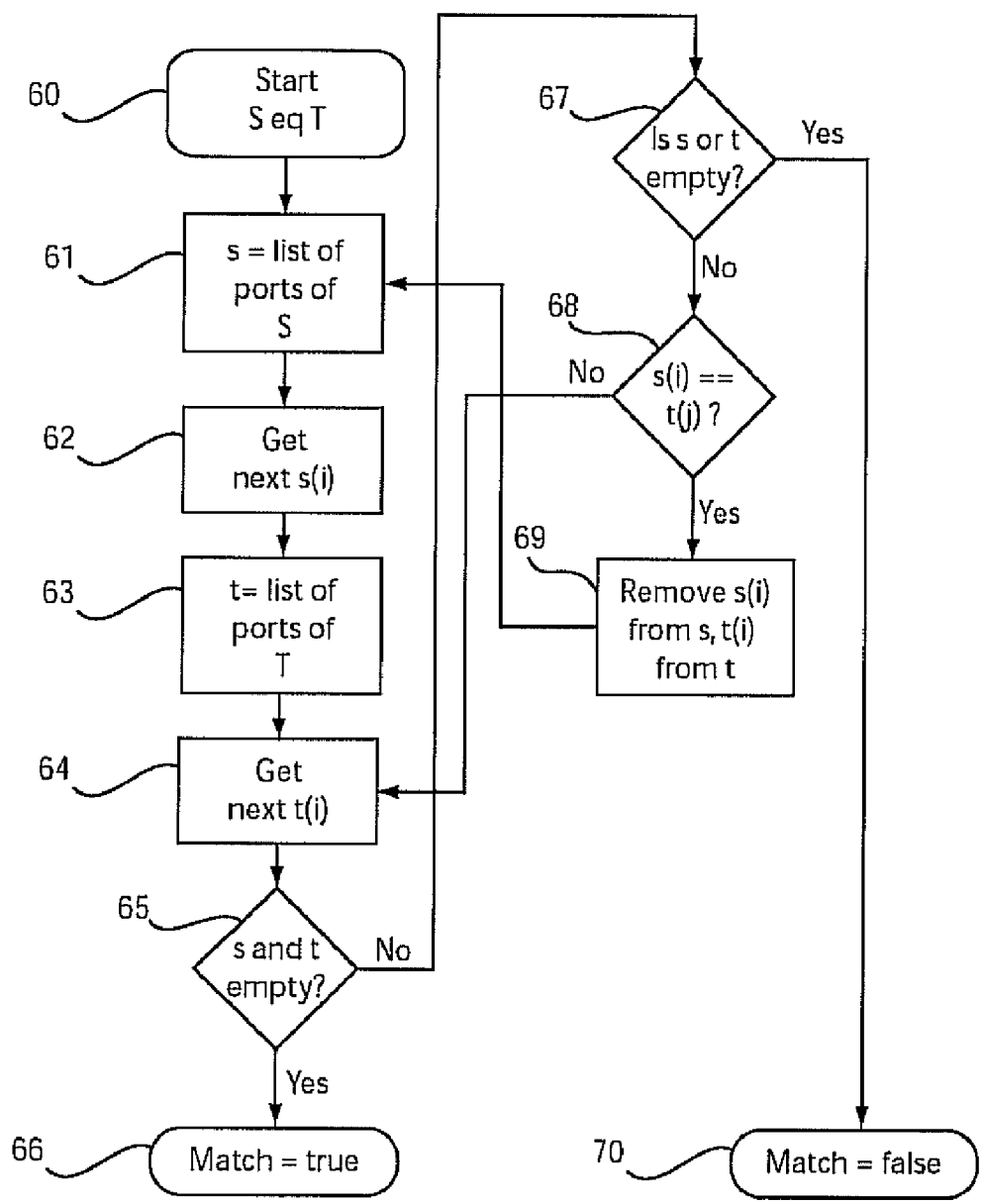
FIG. 6 is a block/flow diagram of a system/method for determining that two PEs are equivalent in accordance with one illustrative embodiment.

Referring to FIG. 6, a system/method for determining the equivalence between two objects is illustratively shown. Determining PE equivalence includes the use of an equivalence operator, which is used to determine if a PE T is functionally equivalent to any of the candidate PEs in set S. Determining the equivalence includes finding matching input ports and output ports for all ports defined by the PE T.

In block 60, the determination of equivalence between two objects, PEs S and T, of the same type is performed. Equivalence is determined by establishing that all of the following conditions are true: (a) S and T have the same number of input and output ports; (b) for each input port from S, an input port in T is found such that their FlowSpec is the same; (c) for each output port from S, an output port in T is found such that their StreamDesc are the same.

A list s of ports belonging to S is obtained in block 61 and a list of ports t belonging to T is obtained in block 63. For each port s(i) in block 62, a port from t(i) from T is obtained in block 64. The two ports are compared in block 68 using the conditions above. If all conditions are true in block 68, s(i) is removed from s and t(i) is removed from t in block 69. The next port s(i) is then obtained from s in block 61 and the process repeats if the condition depicted by block 65 is satisfied. If not all conditions are true, a new t(i) is obtained in block 64 and s(i) and the new t(i) are compared. If a match has been obtained for all ports in s, PE T can be reused in block 66. Otherwise, a mismatch is reported in block 70.

Figure 7:
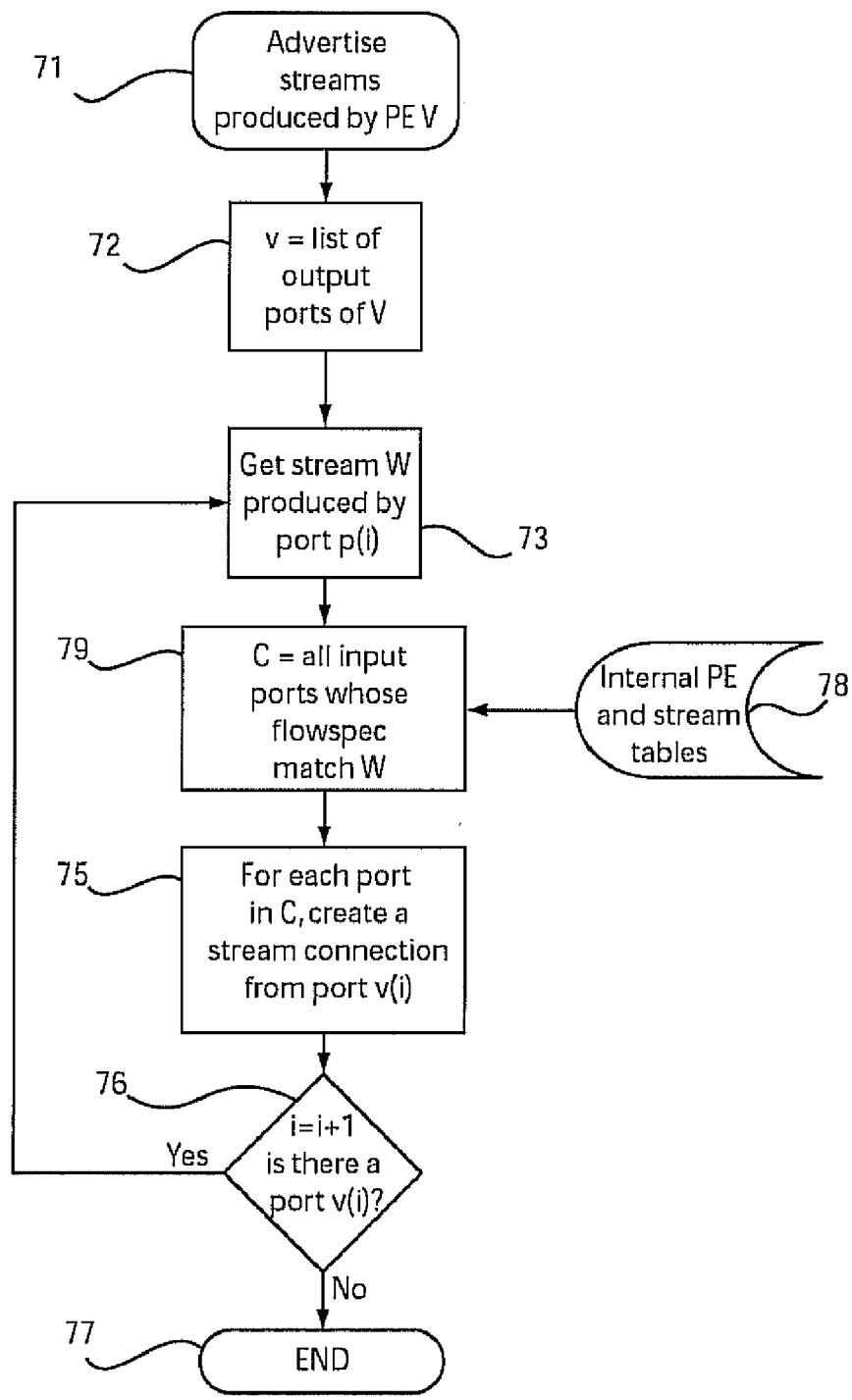
FIG. 7 is a block/flow diagram of a system/method for dynamic application composition based on the availability of new streams in accordance with one illustrative embodiment.

Referring to FIG. 7, an alternate embodiment shows a dynamic application composition of a different nature. As seen before, PEs establish their interest on new data by defining FlowSpecs for each of their input ports. As new streams become available, the DGM connects the PEs producing these streams to existing PEs which have expressed their interest in these new streams. The tasks for detecting new streams for PEs that are already running and dynamic application composition are executed every time a new PE V is added to the Global Runtime Dataflow Graph. The DGM automatically connects potential consumer PEs (which have expressed interest on new streams by defining FlowSpecs) to the newly available streams.

The system/method of FIG. 7 is employed when a new PE V is instantiated by a new application in block 71. The list v of all output ports for the PE is obtained in block 72. The StreamDesc for a stream W produced by a port v(i) is extracted in block 73. In block 79, the list C of input ports whose FlowSpec match the StreamDesc for stream W is obtained by querying the Global Runtime Dataflow Graph internal tables in block 78. Stream W is routed from the output port v(i) to each of the consuming PEs in block 75.

If PE V does not have any more output ports, the process is terminated in block 77. Otherwise, the process is repeated from block 76.

Having described preferred embodiments of a method and system for specifying stream descriptions, stream subscriptions, and PE reuse (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for dynamically building applications for stream processing, comprising the steps of:
    providing processing elements with a flow specification describing each input and a stream description describing each output such that the flow specification indicates a stream or streams which are to be received based on processing information and the stream descriptions indicate the processing information;
    determining, with a processor, processing elements that can be reused by determining equivalence between the processing elements;
    instantiating processing elements that are new and are not reusable; and
    dynamically composing an application, using the instantiated processing elements by routing available streams to the instantiated processing elements in accordance with the flow specifications.

2. The method as recited in claim 1, further comprising the step of providing feedback of results determined by a processing element during a future processing stage to processing elements during earlier processing stages.

3. The method as recited in claim 1, wherein the step of determining processing elements that can be reused includes determining whether the processing elements are functionally equivalent.

4. The method as recited in claim 3, wherein the step of determining whether the processing elements are functionally equivalent includes finding identical input and output ports between the corresponding processing elements.

5. The method as recited in claim 1, wherein the step of determining processing elements that can be reused includes reusing the processing elements in responding to different inquires or employing different applications.

6. The method as recited in claim 1, wherein the step of determining processing elements that can be reused is performed by a dataflow graph manager, and further comprising the step of enabling equivalent processing elements to be reused.

7. The method as recited in claim 1, wherein the step of instantiating processing elements that are new and are not reusable includes:
    comparing new processing elements to a dataflow runtime graph; and
    if an equivalent processing element is not present in the data flow graph instantiating a new processing element.

8. The method as recited in claim 1, wherein the step of dynamically composing an application includes incrementally building the application by connecting new streams to processing elements which have expressed interest in the new streams based on their flow specifications.

9. A computer program product comprising a computer useable medium including a computer readable program, wherein the computer readable program when executed on a computer causes the computer to execute the steps of:
    parsing processing elements with a flow specification describing each input and a stream description describing each output such that the flow specification indicates a stream or streams which are to be received based on content information and the stream descriptions indicate the content information;
    determining processing elements that can be reused by determining equivalence between the processing elements;
    instantiating processing elements that are new and are not reusable; and
    dynamically composing an application, using the instantiated processing elements by routing available streams to the instantiated processing elements in accordance with the flow specifications.

10. The computer program product as recited in claim 9, further comprising the step of providing feedback of results determined by a processing element during a future processing stage to processing elements during earlier processing stages.

11. The computer program product as recited in claim 9, wherein the step of determining processing elements that can be reused includes determining whether the processing elements are functionally equivalent.

12. The computer program product as recited in claim 11, wherein the step of determining whether the processing elements are functionally equivalent includes finding matching input and output ports between the processing elements.

13. The computer program product as recited in claim 9, wherein the step of determining processing elements that can be reused includes reusing the processing elements in responding to different inquires or employing different applications.

14. The computer program product as recited in claim 9, wherein the step of determining processing elements that can be reused is performed by a dataflow graph manager, and further comprising the step of enabling equivalent processing elements to be reused.

15. The computer program product as recited in claim 9, wherein the step of instantiating processing elements that are new and are not reusable includes:
   comparing new processing elements to a dataflow runtime graph; and
   if an equivalent processing element is not present in the graph instantiating a new processing element.

16. The computer program product as recited in claim 9, wherein the step of dynamically composing an application includes incrementally building the application by connecting new streams to processing elements which have expressed interest in the new streams based on their flow specifications.

17. A system for dynamically building applications for stream processing, comprising:
   one or more processing elements having a flow specification describing each input and a stream description describing each output such that the flow specification indicates an existing or yet to exist stream or streams which are to be received based on processing information and the stream descriptions indicate the processing information;
   an application data flow description which identifies a plurality of processing elements and streams needed to perform a task; and
   a dataflow graph manager including a processor, which parses the application dataflow description to determine which processing elements could be reused and which processing elements need to be added to a dataflow graph as instantiated processing elements, wherein the dataflow graph manager enables dynamic composition of an application using the instantiated processing elements by routing available streams to the instantiated processing elements in accordance with their flow specifications.

18. The system as recited in claim 17, further comprising feedback loops which are created between processing elements such that new streams created are fed back to processing elements in an earlier processing stages based on the flow specifications of the earlier processing stage processing elements.

19. The system as recited in claim 17, wherein the data graph manager reuses processing elements if the processing elements called for in the application dataflow description are functionally equivalent including matching input and output ports between the processing elements.

20. The system as recited in claim 17, wherein the processing elements can be reused in responding to different inquires or employing different applications.

21. The system as recited in claim 17, wherein the data flow graph manager incrementally builds an application by connecting new streams to processing elements which have expressed interest in the new streams based on their flow specifications.

* * * * *